(12) United States Patent
Vicente et al.

(10) Patent No.: US 9,130,939 B2
(45) Date of Patent: Sep. 8, 2015

(54) AD HOC DECENTRALIZED CLOUD INFRASTRUCTURE

(71) Applicant: Intel Corporation, Santa Clara, CA (US)

(72) Inventors: John B. Vicente, Roseville, CA (US); Hong C. Li, El Dorado Hills, CA (US); Mark D. Yarvis, Portland, OR (US); James R. Blakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 13/729,623

(22) Filed: Dec. 28, 2012

(65) Prior Publication Data

US 2014/0189120 A1 Jul. 3, 2014

(51) Int. Cl.
*H04L 29/08* (2006.01)
*G06F 9/50* (2006.01)

(52) U.S. Cl.
CPC .............. *H04L 67/10* (2013.01); *G06F 9/5072* (2013.01); *H04L 67/04* (2013.01)

(58) Field of Classification Search
CPC ....... H04L 67/288; H04L 67/28; H04L 67/32; H04L 67/2833; H04L 67/2895; H04W 28/14; H04W 4/005; G06F 3/067; G06F 17/30902

USPC ......... 709/226, 201–203, 216, 217, 219, 224, 709/248

See application file for complete search history.

(56) References Cited

U.S. PATENT DOCUMENTS

| 8,693,453 | B2* | 4/2014 | Priyantha et al. | 370/338 |
| 8,812,015 | B2* | 8/2014 | Das et al. | 455/456.1 |
| 2005/0125536 | A1* | 6/2005 | Bucher | 709/225 |
| 2009/0312033 | A1* | 12/2009 | Shen et al. | 455/456.1 |
| 2010/0070758 | A1* | 3/2010 | Low et al. | 713/155 |
| 2010/0150120 | A1* | 6/2010 | Schlicht et al. | 370/338 |
| 2012/0271908 | A1* | 10/2012 | Luna et al. | 709/216 |

* cited by examiner

*Primary Examiner* — Ruolei Zong
(74) *Attorney, Agent, or Firm* — Barnes & Thornburg LLP

(57) ABSTRACT

Technologies for establishing and utilizing a decentralized cloud infrastructure using a plurality of mobile computing devices include broadcasting for the formation of the decentralized cloud computing and storage infrastructure and establishing wireless communications between the plurality of mobile computing devices. The plurality of mobile computing devices self-organize and cooperate with one another to establish a structured decentralized cloud infrastructure to expose and sharing resources, services, and/or applications for ad hoc or socially-driven decentralized, cloud computing purposes.

20 Claims, 9 Drawing Sheets

AD HOC DECENTRALIZED CLOUD INFRASTRUCTURE

BACKGROUND

Numerous systems exist today to decentralize computing services. For example, there exist social networks, gaming networks, peer-to-peer networking, ad hoc, and mesh network systems, which have found value in local or close proximity settings in which a network can be formed between devices without stationary infrastructure (e.g., servers and routers). Each of those systems, however, is typically very limited in size and scope. Additionally, the provisioning of network services may be limited or simply unavailable.

Cloud computing permits computing resources to be shared with remote, and oftentimes dispersed, computing devices. Additionally, infrastructure as a service (IaaS) permits a cloud provider to offer users access to various cloud resources via virtual machines and a virtual cloud infrastructure. However, cloud computing environments are pre-established and not generated ad hoc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
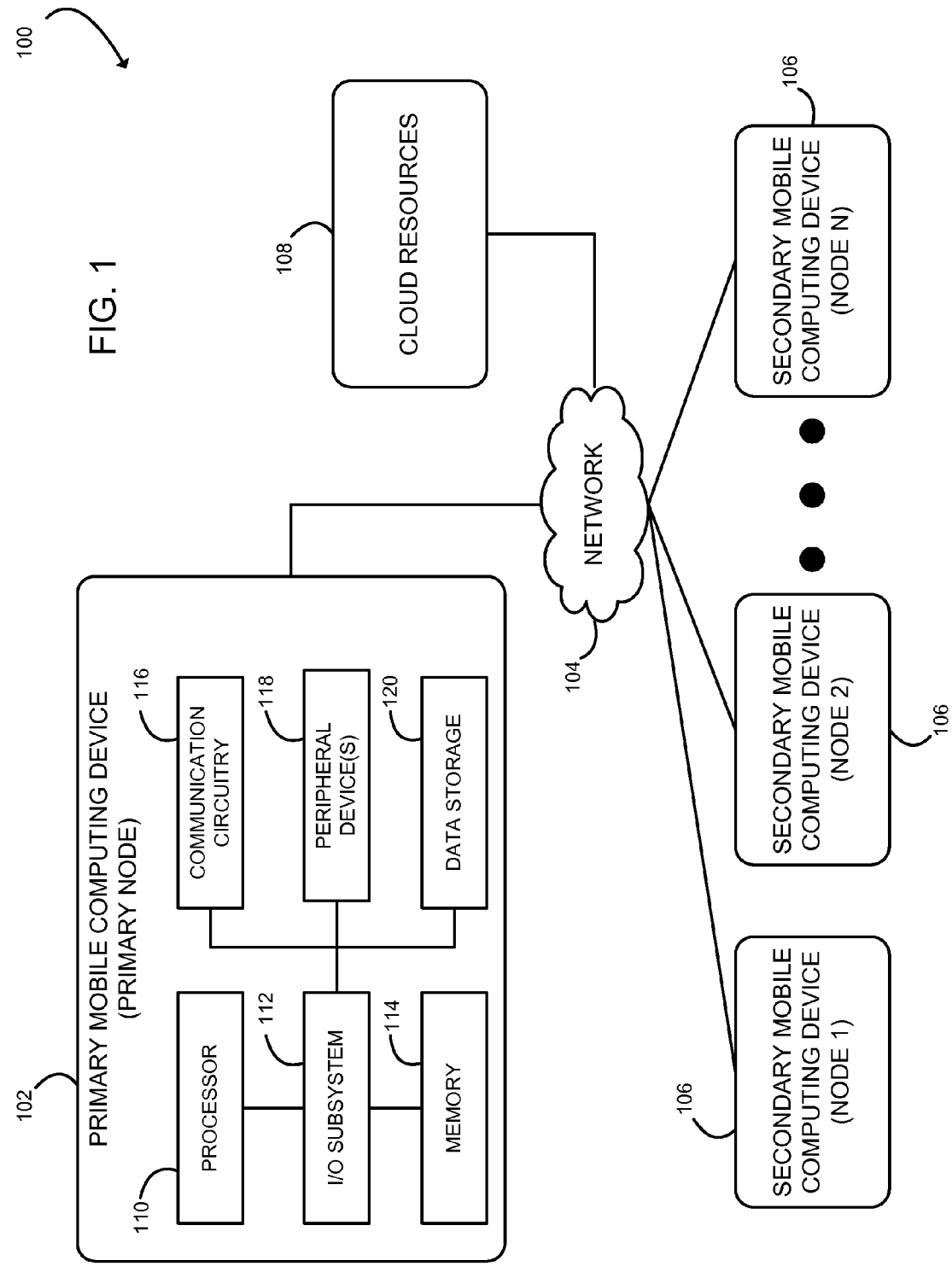
FIG. 1 is a simplified block diagram of at least one embodiment of a system for generating and utilizing a decentralized cloud infrastructure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for generating and utilizing a decentralized cloud infrastructure includes a primary mobile computing device 102, a network 104, one or more secondary mobile computing devices 106, and cloud resources 108. In use, as discussed in more detail below, the primary mobile computing device 102 and the one or more secondary mobile computing device 106 may establish and utilize a decentralized cloud infrastructure to share cloud and local resources with one another. Although only one network 104 and one cloud resources 108 are illustratively shown in FIG. 1, the system 100 may include any number networks 104 and cloud resources 108. For example, the cloud resources 108 may be distributed across several computing devices and/or databases. In another embodiment, the primary mobile computing device 102 and the secondary mobile computing devices 106 may communicate via a plurality of networks 104. Similarly, as illustrated in FIG. 1, the system 100 may include any number of secondary mobile computing device 106. Further, in some embodiments, the primary mobile computing device 102 and the secondary mobile computing devices 106 are similar and may be referred to collectively as mobile computing devices 102, 106 (also referred to as "nodes").

The primary mobile computing device 102 may be embodied as any type of computing device capable of establishing a communication link with at least one of the secondary mobile computing devices 106 and performing the functions described herein. For example, the primary mobile computing device 102 may be embodied as a cellular phone, smartphone, tablet computer, laptop computer, personal digital assistant, mobile Internet device, or other mobile computing/communication device. As shown in FIG. 1, the illustrative primary mobile computing device 102 includes a processor 110, an input/output ("I/O") subsystem 112, a memory 114, a communication circuitry 116, one or more peripheral devices 118, and a data storage 120. Of course, the primary mobile computing device 102 may include other or additional components, such as those commonly found in a computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the primary mobile computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the primary mobile computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the primary mobile computing device 102, on a single integrated circuit chip.

The communication circuitry 116 of the primary mobile computing device 102 may be embodied as any communication circuit, device, or collection thereof, capable of enabling communications between the primary mobile computing device 102 and other remote devices (e.g., the secondary mobile computing devices 106 and devices within the cloud resources 108) over the network 104. The communication circuitry 116 may be configured to use any one or more communication technology (e.g., wireless or wired communications) and associated protocols to effect such communication. For example, in some embodiments, the communication circuitry 116 may be embodied as, or otherwise include, near field communication circuitry, Bluetooth® communication circuitry, Wi-Fi® communication circuitry, and/or other short-ranged wireless communication circuitry. Additionally, in some embodiments, the communication circuitry 116 may include long-ranged wireless communication circuitry such as, for example, cellular communication circuitry and/or other long-ranged wireless communication circuitry.

The peripheral devices 118 of the primary mobile computing device 102 may include any number of additional peripheral or interface devices. The particular devices included in the peripheral devices 118 may depend on, for example, the intended use of the primary mobile computing device 102. The data storage 120 may be embodied as any type of device or devices configured for short-term or long-term storage of data such as, for example, memory devices and circuits, memory cards, hard disk drives, solid-state drives, or other data storage devices.

The network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof. In one embodiment, the network 104 is embodied as or otherwise includes at least one of a Global System for Mobile Communications (GSM) cellular network, a Universal Mobile Telecommunications System (UMTS) cellular network, and a Long Term Evolution (LTE) mobile communication network.

The secondary mobile computing devices 106 may be embodied as any type of computing device capable of performing the functions described herein. For example, in some embodiments, the secondary mobile computing devices 106 may be similar to the primary mobile computing device 102 as described above. That is, each of the secondary mobile computing devices 106 may be embodied as a cellular phone, smartphone, tablet computer, laptop computer, personal digital assistant, mobile Internet device, or other mobile computing/communication device. Further, each of the secondary mobile computing devices 106 may include components similar to those of the primary mobile computing device 102 discussed above. The description of those components of the primary mobile computing device 102 is equally applicable to the description of components of the secondary mobile computing devices 106 and is not repeated herein for clarity of the description. Further, it should be appreciated that any of the secondary mobile computing devices 106 may include other components, sub-components, and devices commonly found in a computing device, which are not discussed above in reference to the primary mobile computing device 102 and not discussed herein for clarity of the description.

The cloud resources 108 may be embodied as any computing device or collection of computing devices capable of communicating with the primary mobile computing device 102 and/or the secondary mobile computing devices 106 over the network 104 and performing the functions described herein. It should be appreciated that, in some embodiments, the cloud resources 108 may be distributed and/or duplicated across multiple computing devices. In some embodiments, the cloud resources 108 may include, for example, one or more stationary mobile computing devices, which may be used to bootstrap decentralized services to the primary mobile computing device 102 and/or the secondary mobile computing devices 106 as discussed in detail below.

It should be appreciated that the system 100 may establish, maintain, and service the decentralized cloud infrastructure in a self-organizing, self-provisioning, and self-managing manner. That is, each of the mobile computing devices 102, 106 may establish, maintain, and/or service the decentralized cloud infrastructure in an automated manner with little to no intervention or direction from the individual users of the mobile computing devices 102, 106 (e.g., each mobile computing device 106 may join the decentralized cloud infrastructure with minimal or no interaction by the user to facilitate such joining). Additionally, it should be appreciated that the system 100 may be used in different embodiments for many different purposes as discussed in detail below. In some embodiments, a stationary computing device (e.g., affixed to a stadium) may be used to facilitate the establishment of the decentralized cloud infrastructure. In other embodiments, a decentralized cloud infrastructure may be established without such stationary infrastructure dependence. Further, the system 100 may be used by the public and private sector alike. For example, an ad hoc decentralized cloud infrastructure may be established in military or battlefield situations or in response to the occurrence of a natural disaster.

Figure 2:
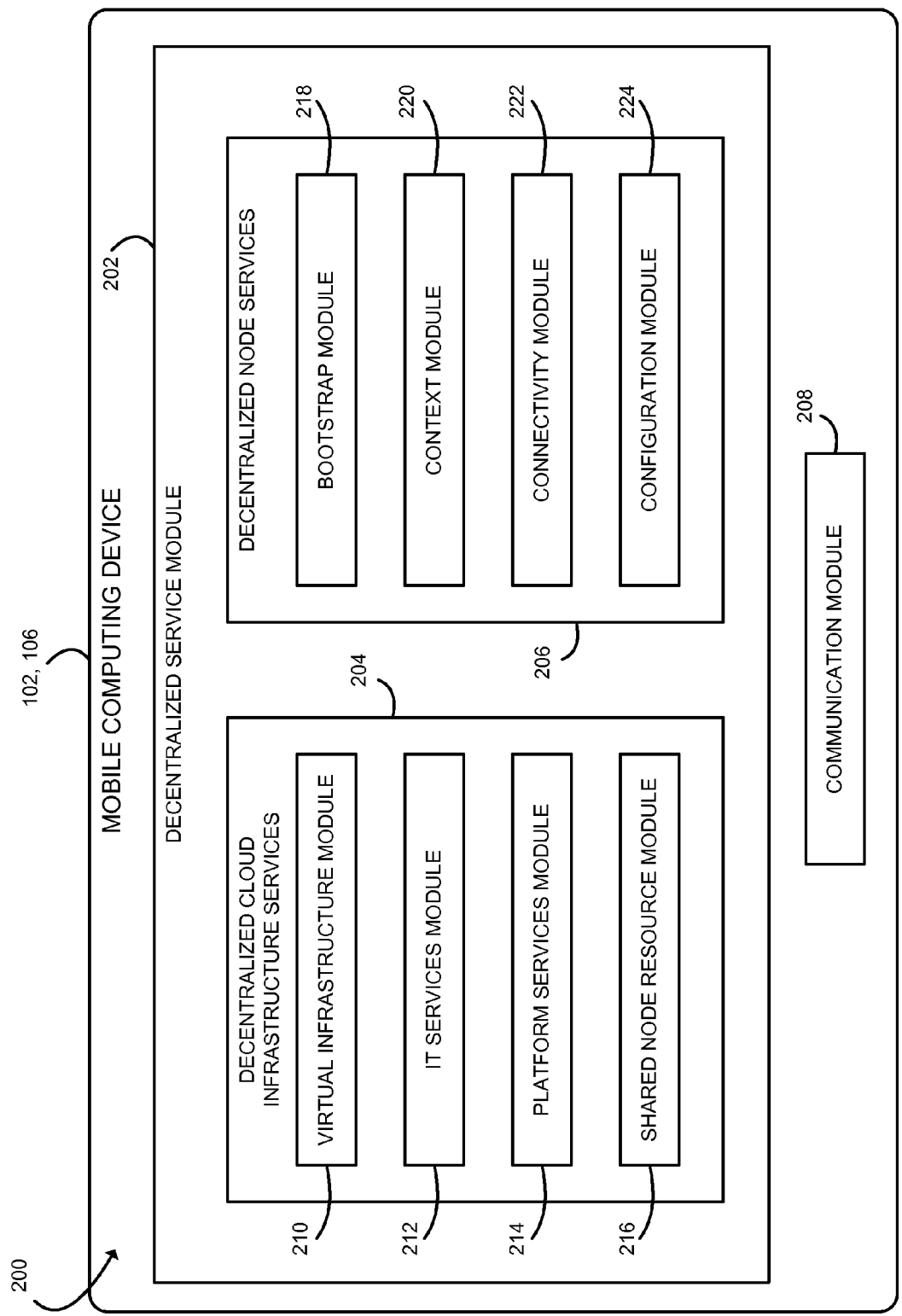
FIG. 2 is a simplified block diagram of at least one embodiment of an environment of a mobile computing device of the system of FIG. 1.

Referring now to FIG. 2, in use, the primary mobile computing device 102 and the secondary mobile computing devices 106 may establish an environment 200 for establishing and utilizing a decentralized cloud infrastructure. The environment 200 in the illustrative embodiment includes a decentralized service module 202 and a communication module 208, each of which may be embodied as software, firmware, hardware, or a combination thereof. Further, the decentralized service module 202 includes decentralized cloud infrastructure services 204 and decentralized node services 206.

The decentralized service module 202 may be used to share decentralized services (i.e., decentralized cloud infrastructure services 204 and decentralized node services) between each of the primary mobile computing device 102 and the secondary mobile computing devices 106. As discussed in detail below, the mobile computing devices 102, 106 may share decentralized services with one another to establish the decentralized cloud infrastructure.

The decentralized cloud infrastructure services 204 may include core services for establishing the decentralized cloud infrastructure. For example, in the illustrative embodiment of FIG. 2, the decentralized cloud infrastructure services 204 include a virtual infrastructure module 210, an information technology (IT) module 212, a platform services module 214, and a shared node resource module 216. Of course, the decentralized cloud infrastructure services 204 may include additional or other modules in other embodiments. In some embodiments, the virtual infrastructure module 210, the IT module 212, the platform services module 214, and the shared node resource module 216 compose the core layers of the decentralized cloud infrastructure. As discussed in detail below, in some embodiments, each node may participate in one or more of those layers. As such, some nodes may choose not to implement one or more of the layers (or some services of the layers). In such an embodiment, those nodes may not include all services necessary to fully cooperate in the decentralized cloud infrastructure.

The virtual infrastructure module 210 may determine the amount of cloud resources available to nodes. For example, in some embodiments, the virtual infrastructure module 210 may virtualize and consolidate node resources. For example, the virtual infrastructure module 210 may associate three nodes with the decentralized cloud infrastructure in which each node has 10 GB of available shared data storage. The virtual infrastructure module 210 may virtualize and consolidate the shared data storage to indicate that the decentralized cloud infrastructure has available 30 GB of shared data storage. The virtual infrastructure module 210 may similarly virtualize other local node resources (e.g., services, processor resources, other computing resources, etc.). That is, the virtual infrastructure module 210 may establish shared decentralized cloud resources usable by the mobile computing devices 102, 106.

The IT services module 212 may perform IT functions and services related to the decentralized cloud infrastructure. For example, the IT services module 212 may ensure security, management, delivery, and maintenance of the decentralized cloud environment. Further, in some embodiments, the IT services module 212 may handle domain name services and perform other distributed network functions. The platform services module 214 may perform decentralized platform services (e.g., services specific to the platform of the mobile computing devices 102, 106). In some embodiments, decentralized platform services may include, for example, common platform services such as messaging, content delivery, distributed processing, payments, and other services from which an entity may build complete solutions.

The shared node resource module 216 permits each mobile computing device 102, 106 to share cooperative applications and user services with other mobile computing devices 102, 106. For example, the primary mobile computing device 102 may offer its local resources to a secondary mobile computing device 106. The primary mobile computing device 102 may also receive from the secondary mobile computing device 106 offers of resources local to the secondary mobile computing device 106. As discussed in greater detail below, local resources may include hardware/computational resources (e.g., memory and data storage, unused processing power, etc.), services, and other cooperative applications (e.g., peer-to-peer content sharing, etc.). In some embodiments, each mobile computing device 102, 106 may choose which end-user centered applications and/or services they expose or register for advertisement sharing purposes (i.e., which applications/services they offer) and which applications and/or services they discover for consumption purposes (i.e., which applications/services they accept offers of). Additionally, it should be appreciated that in some embodiments, the mobile computing device 102, 106 may offer their applications and services for free or at a cost to the other mobile computing devices 102, 106. For example, one mobile computing device 102, 106 may sell local storage space to another mobile computing device 102, 106.

The decentralized node services 206 may include a bootstrap module 218, a context module 220, a connectivity module 222, and a configuration module 224, each of which may be embodied as software, firmware, hardware, or a combination thereof. In some embodiments, one or more of the bootstrap module 218, the context module 220, the connectivity module 222, and the configuration module 224 may be incorporated in or otherwise combined with one or more of the decentralized cloud infrastructure services 204. For example, the configuration module 224 may be incorporated in the virtual infrastructure module 210 in some embodiments. Accordingly, as with the decentralized cloud infrastructure services 204, each of the mobile computing devices 102, 106 may not include one or more of the decentralized node services 206.

The bootstrap module 218 may perform some function to allow a service or application to be loaded onto one of the mobile computing devices 102, 106. For example, the bootstrap module 218 of the primary mobile computing device 102 may download and/or configure one of the decentralized cloud infrastructure services 204 or a shared node resource for the primary mobile computing device 102. In another embodiment, the bootstrap module 218 may be used by one mobile computing device 102, 106 to bootstrap something onto one of the other mobile computing device 102, 106.

The context module 220 may determine the context of the mobile computing device 102, 106 at a particular point in time. For example, in some embodiments, the context module 220 has awareness and introspection capabilities such that the context module 220 is able to determine the internal and external environment of the mobile computing device 102, 106 (e.g., using one or more sensors of the mobile computing device 102, 106). In one embodiment, the context module 220 may determine the geographical location of the mobile computing device 102, 106. Additionally or alternatively, the context module 220 may determine how or for what purpose the mobile computing device 102, 106 is being used. In yet other embodiments, the context module 220 may otherwise determine the current situation of the mobile computing device 102, 106 (e.g., mobile environment, military environment, stadium environment, and natural disaster situation, etc.).

The connectivity module 222 may allow the mobile computing device 102, 106 to register/advertise shared node resources. That is, in some embodiments, the connectivity module 222 permits one mobile computing device 102, 106 to offer local resources to and receive offers of local resources from another mobile computing device 102, 106. The configuration module 224 manages the complex decentralized cloud infrastructure. Additionally, in some embodiments, the communication module 208 may handle the communication between the mobile computing device 102, 106 and remote devices (e.g., other mobile computing devices 102, 106 and cloud resources 108) through the network 104. Each of the decentralized service module 202, the communication module 208, the virtual infrastructure module 210, the IT services module 212, the platform services module 214, the shared node resource module 216, the bootstrap module 218, the context module 220, the connectivity module 222, and the configuration module 224 may be embodied as hardware, software, firmware, or a combination thereof.

Referring now to FIGS. 3A-3D, in use, each of the mobile computing devices 102, 106 may cooperate to establish a decentralized cloud network 300. As discussed above, the decentralized cloud network 300 may include multiple layers including a decentralized virtual infrastructure layer, a decentralized platform services layer, a decentralized shared IT services layer, and a cooperative application/user services layer. Each of the layers of the decentralized cloud network 300 can be conceptually illustrated as a virtual mesh of interconnected, peer-to-peer computing nodes (i.e., the mobile computing devices 102, 106). In this may, the structure of the decentralized cloud network 300 can be visualized as a decentralized, virtualized, and layered.

Figure 3A:
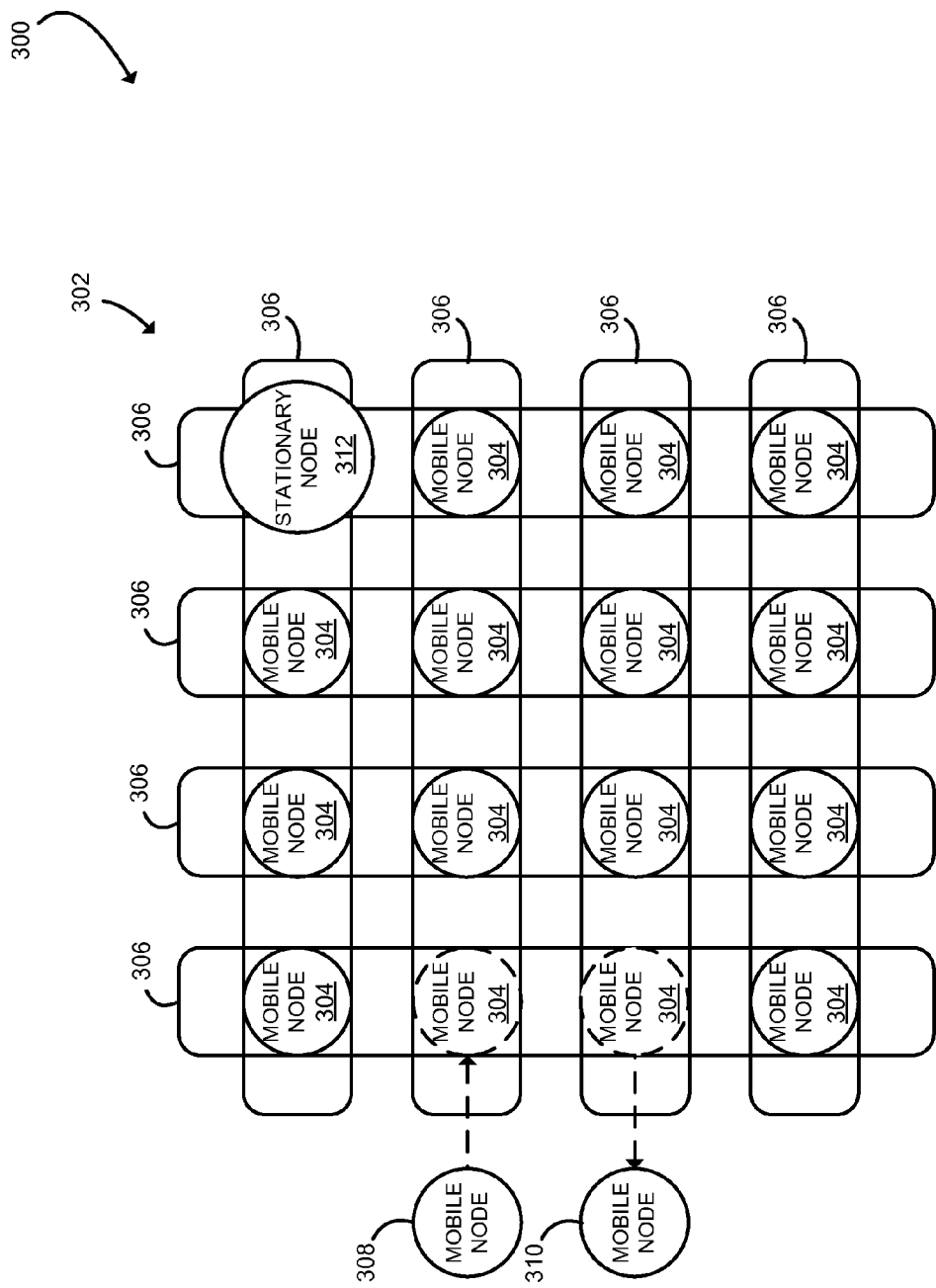
FIGS. 3A-3D are a simplified block diagram of at least one embodiment of different virtual layers of the decentralized cloud infrastructure established by the system of FIG.

For example, an illustrative embodiment of the decentralized virtual infrastructure layer 302 is shown in FIG. 3A. The decentralized virtual infrastructure layer 302 includes a plurality of network nodes 304, embodied as the various mobile computing devices 102, 106, interconnected with a virtualized infrastructure 306 (shown in FIG. 3A as mesh interconnections between the nodes 304). The virtualized infrastructure 306 is an abstract visualization of the virtualized computational, network, storage, and database resources of the decentralized cloud network 300, which are formed from the individual resources of each of the participating network nodes 304. As such, it should be appreciated that some nodes may contribute greater or additional virtualized resources to the decentralized cloud network 300 relative to other nodes. Additionally, as discussed above, nodes may join and leave the decentralized cloud network 300 at any time. For example, an arriving node 308 and a departing node 310 are illustrated in FIG. 3A. Further, as discussed above, the mobile computing devices 102, 106 may also interact with a stationary mobile computing device (i.e., mobile node 312) forming the decentralized cloud network 300. For example, the primary mobile computing device 102 may utilize a stationary mobile computing device 302 to bootstrap decentralized services not already on the primary mobile computing device 102 when first broadcasting for the establishment of the decentralized cloud network 300.

Figure 3B:
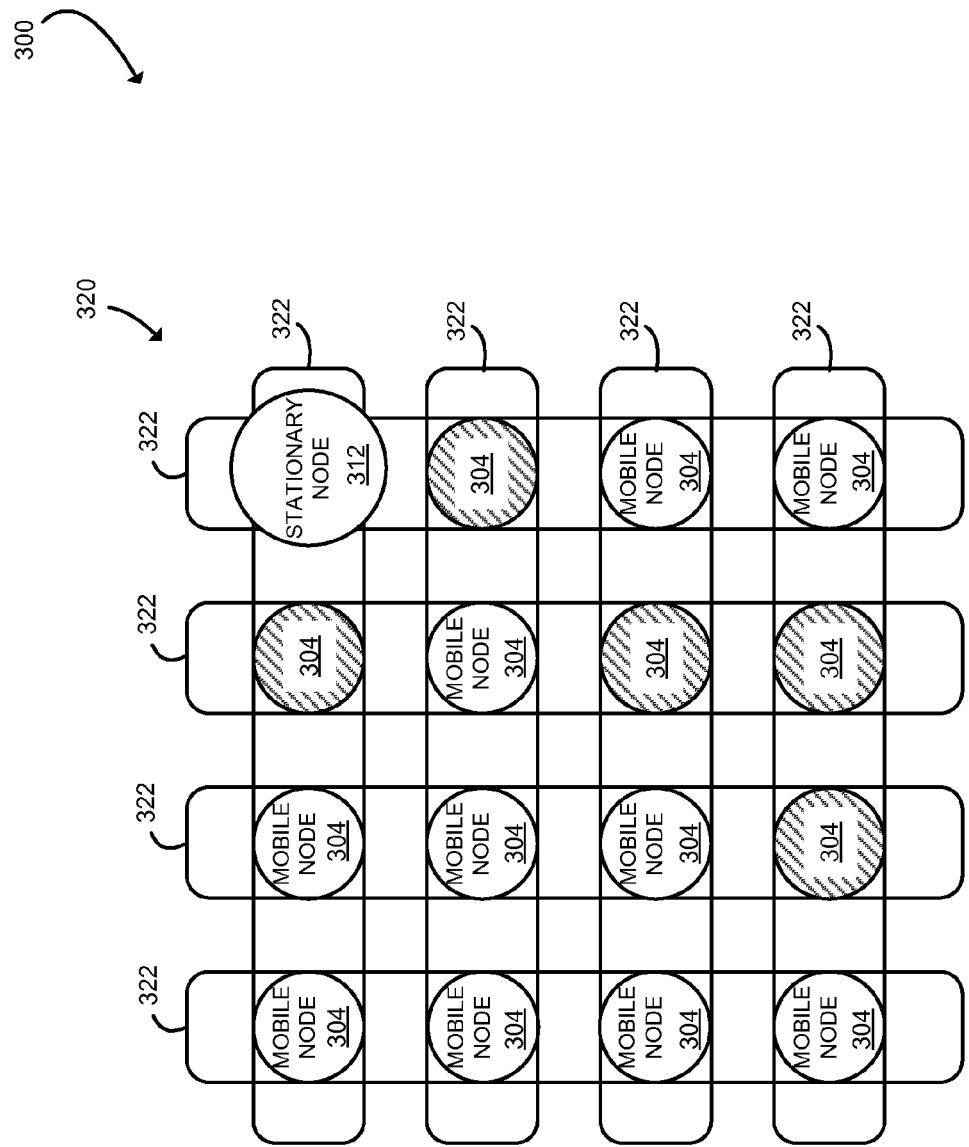

As shown in FIG. 3B, an illustrative embodiment of the decentralized platform services layer 320, which is established on (i.e., layered over) the decentralized virtual infrastructure layer 302, is shown. The decentralized platform services layer 320 includes the plurality of network nodes 304 interconnected with virtualized service connections 322 (shown in FIG. 3B as mesh interconnections between the nodes 304). The virtualized service connections 322 is an abstract visualization of the decentralized platform service resources of the decentralized cloud network 300, which are formed from the platform service resources offered by each of the participating network nodes 304. It should be appreciated that the platform services are decentralized, such that some network nodes may have more platform service resources than others. For example, those network nodes 304 of FIG. 3B shown in hash may be embodied as network nodes 304 having or offering one or more platform services, which may be different between each offering network node 304. Those network nodes 304 of FIG. 3B that are not shown in hash may be embodied as network nodes 304 consuming those platform services offered by the other network nodes 304 (e.g., those network nodes 304 having fewer platform services or those network nodes 304 not offering any platform services). As such, rather than being stored and available from a single node 304 of the decentralized cloud network 300, the platform service resources are spread across the various nodes 304 of the network 300 in a decentralized manner based on the needs of each individual node 304 and are available to any node 304 of the network 300 via a peer-to-peer connection as discussed above.

Figure 3C:
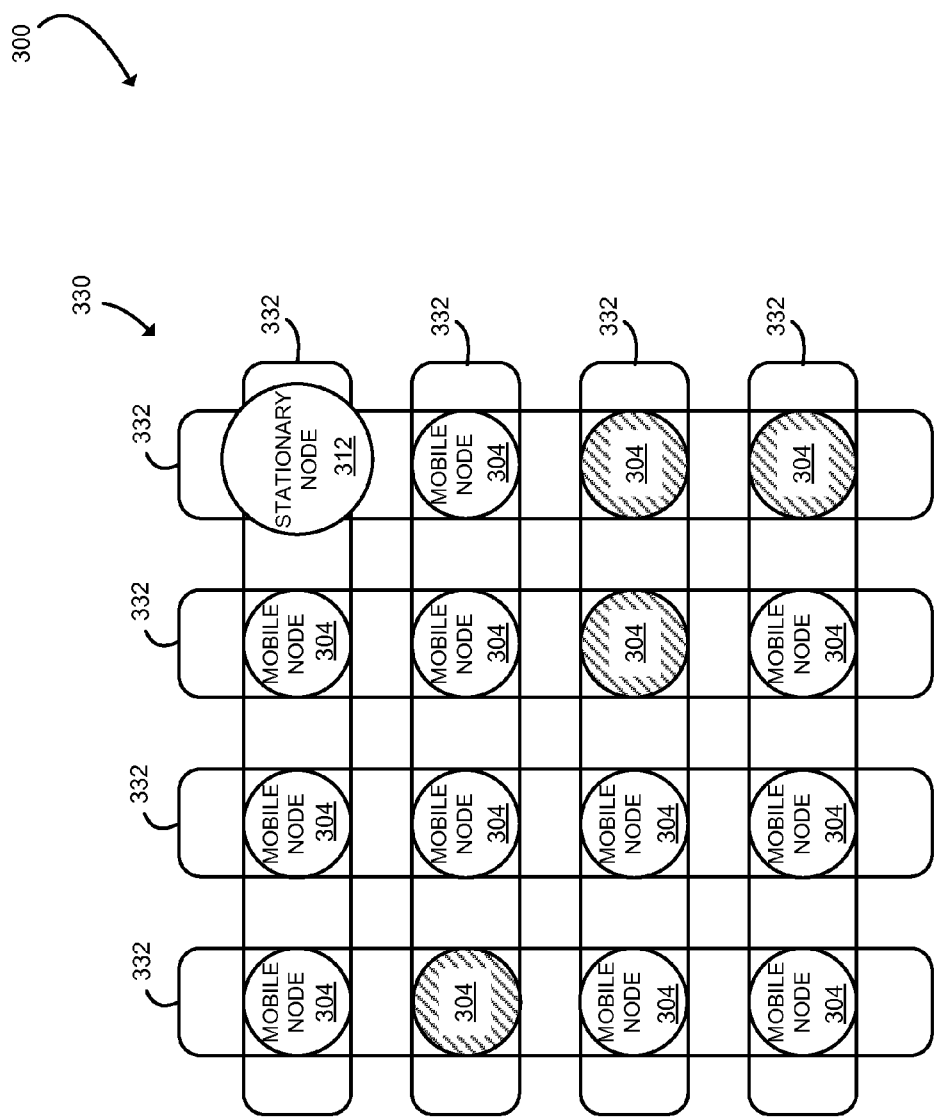

As shown in FIG. 3C, an illustrative embodiment of the decentralized shared IT services layer 330 is established on (i.e., layered over) the decentralized platform services layer 320 and includes the plurality of network nodes 304 interconnected with virtualized service connections 332 (shown in FIG. 3C as mesh interconnections between the nodes 304). The virtualized service connections 332 is an abstract visualization of the decentralized shared IT service resources of the decentralized cloud network 300, which are formed from the shared IT service resources offered by each of the participating network nodes 304. As with the decentralized platform services, it should be appreciated that the shared IT services are decentralized, such that some network nodes may have more IT service resources than others. For example, those network nodes 304 of FIG. 3C shown in hash may be embodied as network nodes 304 having or offering one or more IT services, which may be different between each offering network node 304. Those network nodes 304 of FIG. 3C that are not shown in hash may be embodied as network nodes 304 consuming those IT services offered by the other network nodes 304 (e.g., those network nodes 304 having fewer IT services or those network nodes 304 not offering any IT services). As such, rather than being stored and available from a single node 304 of the decentralized cloud network 300, the shared IT service resources are spread across the various nodes 304 of the network 300 in a decentralized manner based on the needs of each individual node 304 and are available to any node 304 of the network 300 via a peer-to-peer connection.

Figure 3D:
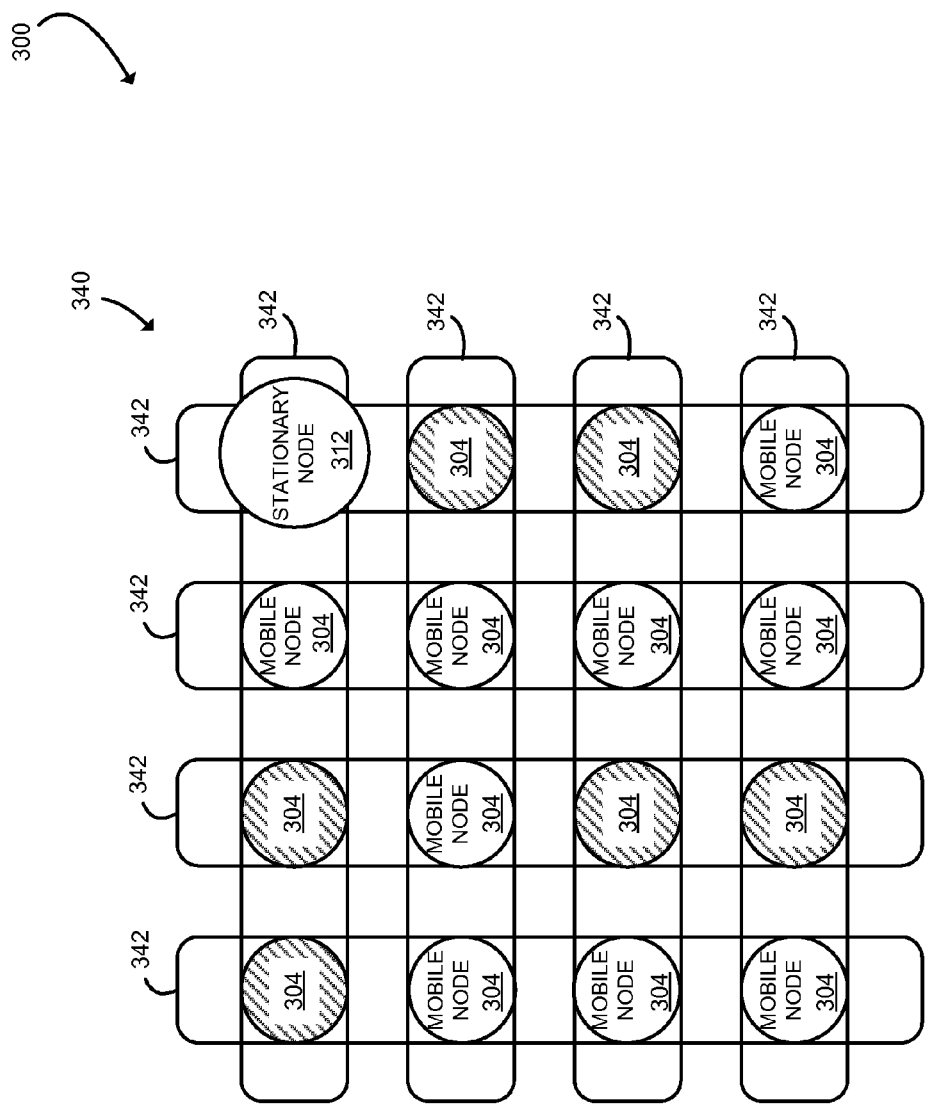

As shown in FIG. 3D, an illustrative embodiment of the decentralized cooperative application/user services layer 340, which is also established on (i.e., layered over) the decentralized platform services layer 320, is shown. The decentralized cooperative application/user services layer 340 includes the plurality of network nodes 304 interconnected with virtualized service connections 342 (shown in FIG. 3C as mesh interconnections between the nodes 304). The virtualized service connections 342 is an abstract visualization of the decentralized cooperative application/user service resources of the decentralized cloud network 300, which are formed from the cooperative application/user service resources offered by each of the participating network nodes 304. As with the decentralized platform services, it should be appreciated that the cooperative application/user services are decentralized, such that some network nodes may have more cooperative application/user service resources than others. For example, those network nodes 304 of FIG. 3D shown in hash may be embodied as network nodes 304 having or offering one or more cooperative application/user services, which may be different between each offering network node 304. Those network nodes 304 of FIG. 3D that are not shown in hash may be embodied as network nodes 304 consuming those cooperative application/user services offered by the other network nodes 304 (e.g., those network nodes 304 having fewer cooperative application/user services or those network nodes 304 not offering any cooperative application/user services). As such, rather than being stored and available from a single node 304 of the decentralized cloud network 300, the cooperative application/user service resources are spread across the various nodes 304 of the network 300 in a decentralized manner based on the needs of each individual node 304 and are available to any node 304 of the network 300 via a peer-to-peer connection.

Figure 4:
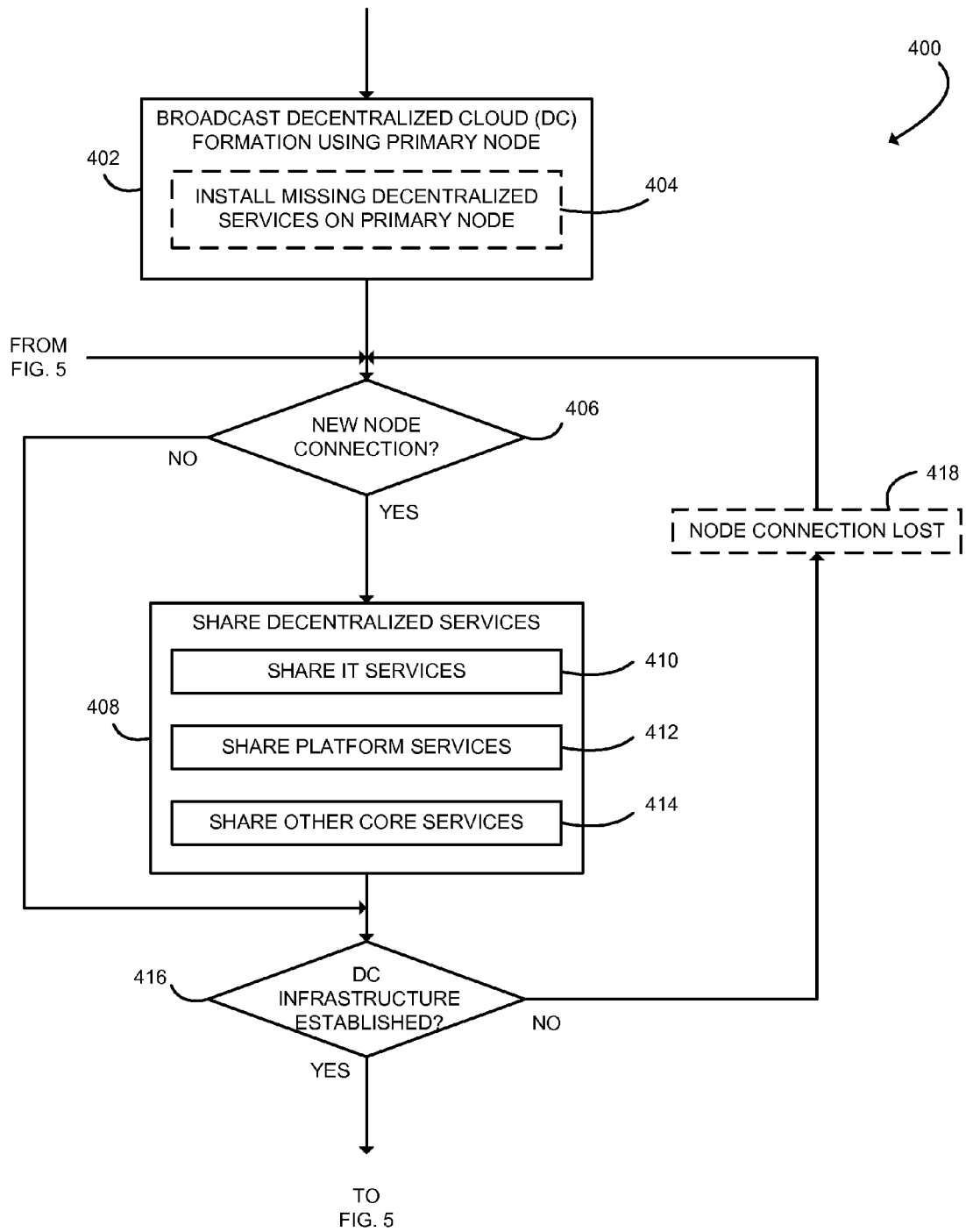
FIGS. 4 and 5 are a simplified flow diagram of at least one embodiment of a method for establishing and utilizing a decentralized cloud infrastructure with the mobile computing devices of the system of FIG. 1.

Referring now to FIG. 4, in use, the mobile computing devices 102, 106 may execute a method 400 for utilizing a decentralized cloud infrastructure. As discussed above, in some embodiments, the mobile computing devices 102, 106 may establish and/or utilized the decentralized cloud infrastructure without user intervention or with minimal user intervention (e.g., for authentication purposes). The method 400 begins with block 402 in which the primary mobile computing device 102 broadcasts for the formation of the decentralized cloud. That is, the primary mobile computing device 102 indicates to one or more secondary mobile computing devices 106 in the vicinity that the primary mobile computing device 102 is interested in forming a decentralized cloud infrastructure. In doing so, in block 404, the primary mobile computing device 102 may install one or more decentralized services not already on the primary mobile computing device 102 by retrieving (or bootstrapping) those services from one or more stationary computing devices (e.g., a device made available for such purposes at a stadium). It should be appreciated that the primary mobile computing device 102 is denoted as "primary" due to its origination of the decentralized cloud infrastructure. In other embodiments (e.g., at another point in time), one of the secondary mobile computing device 106 may act as the "primary" computing device by executing block 402 to broadcast for the formation of the decentralized cloud.

In block 406, the system 100 determines whether a new node connection has been established. For example, in the first instance, the primary mobile computing device 102 determines whether one of the secondary mobile computing devices 106 has established a communication connection with the primary mobile computing device 102 to form the decentralized cloud. After the primary mobile computing device 102 establishes a connection with the first secondary mobile computing device 106 (i.e., in subsequent iterations of block 406), the system 100 determines whether another secondary mobile computing device 106 establishes a connection with one of the mobile computing devices 102, 106 already connected.

If the system 100 determines that a new node connection has been established, the connected mobile computing devices 102, 106 share decentralized services with one another in block 408. In doing so, the mobile computing devices 102, 106 may share IT services in block 410, share platform services in block 412, and/or share other core services in block 414. Each of the mobile computing devices 102, 106 may participate in all or only some of the layers as discussed above. For example, if a newly connecting secondary mobile computing device 106 wants to participate in each layer but has no decentralized services already on it, each of the virtual infrastructure module 210, the IT services module 212, the platform services module 214, and the shared node resource module 216 may be installed or bootstrapped to the new secondary mobile computing device 106 (e.g., from another connected mobile computing device 102, 106 or a stationary computing device). It should be appreciated that, in some embodiments, as the number of nodes in the decentralized cloud increases, the decentralized cloud infrastructure becomes more robust. As such, in some embodiments, the decentralized cloud begins to behave like a traditional cloud environment once a critical number of cloud nodes is obtained.

In block 416, the system 100 determines whether the decentralized cloud infrastructure has been established or maintained. Returning to block 406, if the system 100 determines that no new node connection has been established, the method 400 advances to block 416. In some embodiments, determining whether the decentralized cloud infrastructure has been established comprises determining whether a critical number of mobile computing devices 102, 106 are connected to one another. In another embodiment, in order for the decentralized cloud infrastructure to be established, the number of connected mobile computing devices 102, 106 must reach a predefined number (e.g., in a predefined amount of time). In other embodiments, the decentralized cloud infrastructure is established when a critical amount of decentralized services are available to the members of the decentralized cloud (i.e., the connected mobile computing devices 102, 106). In yet another embodiment, a combination of those criteria and others may be used. In some embodiments, the decentralized cloud infrastructure is maintained as long as the requirements to establish the decentralized cloud are still met. If, in block 416, the system 100 determines that the decentralized cloud infrastructure is not established, the system 100 determines whether a node connection has been lost in block 418 (i.e., a mobile computing device 102, 106 has disconnected). The method 400 advances to block 406 in which the system 100 determines whether a new node has connected.

Figure 5:
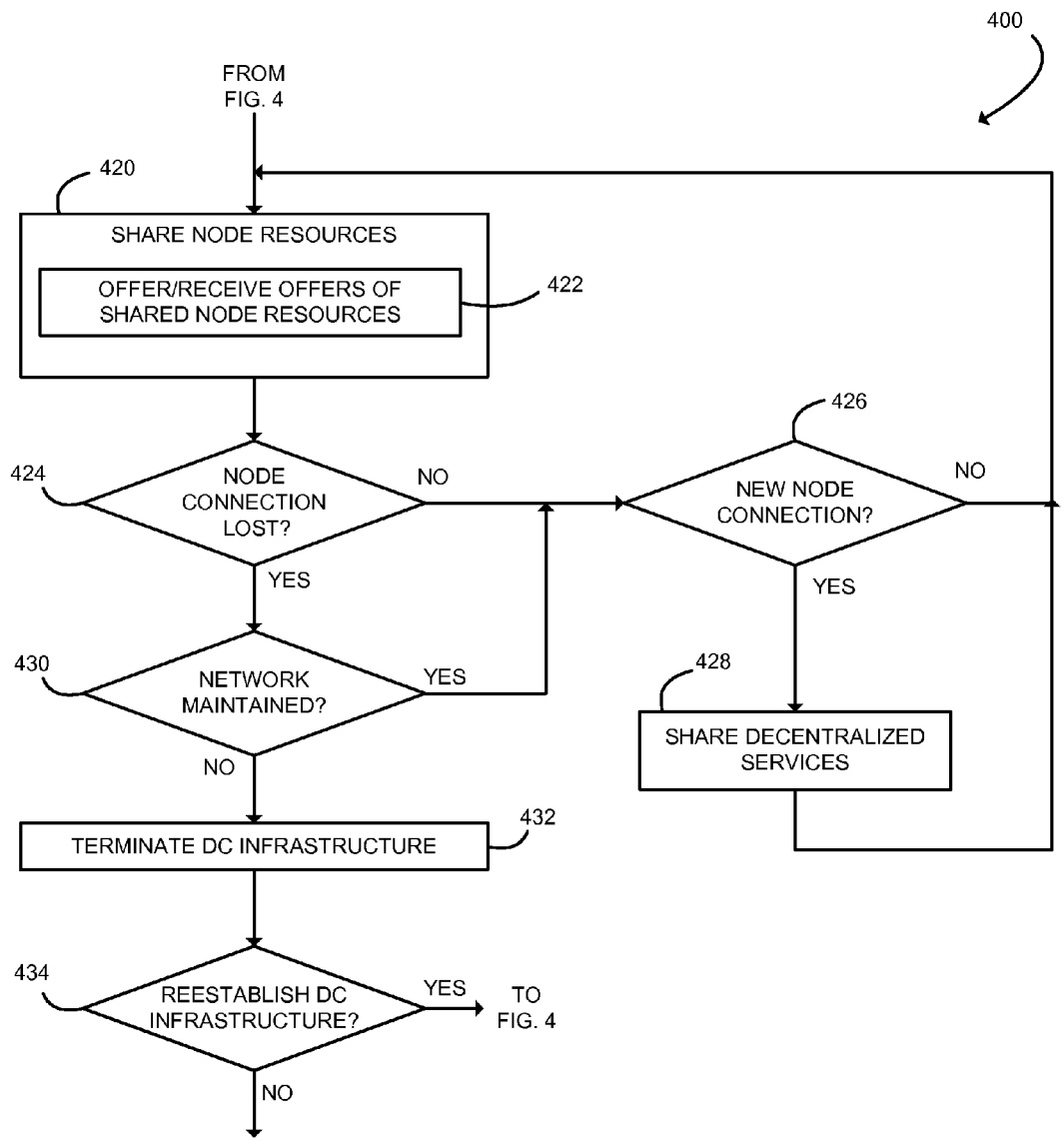

Referring now to FIG. 5, if the system 100 determines in block 416 (see FIG. 4) that the decentralized cloud infrastructure has been established, the mobile computing devices 102, 106 share node resources in block 420. In doing so, in block 422, each mobile computing device 102, 106 may offer shared local resources to the other mobile computing devices 102, 106 in the decentralized cloud. Similar, each mobile computing device 102, 106 may receive offers of the shared local resources of the other mobile computing devices 102, 106. In other words, the system 100 establishes shared decentralized cloud resources for use by the mobile computing devices 102, 106.

In block 424, the system 100 determines whether a node connection has been lost. If a node connection has been lost, the system 100 determines whether the decentralized cloud infrastructure has been maintained in block 430 (e.g., has the number of nodes dropped below the critical number). If not, in block 432, the system 100 terminates the decentralized cloud infrastructure in block 432. That is, in some embodiments, the mobile computing devices 102, 106 become unable to share node resources with one another. In block 434, the system 100 determines whether to reestablish the decentralized cloud infrastructure. If so, the method 400 returns to block 406 of FIG. 4 in which the system 100 determines whether new node connection has been established.

If the system 100 determines in block 424 that a node connection has not been lost and/or the decentralized cloud infrastructure has otherwise been maintained in block 430, the system 100 determines whether a new node has connected in block 426. If so, in block 428, the mobile computing devices 102, 106 share decentralized services. More specifically, in some embodiments, the newly connected secondary mobile computing device 106 may install one or more decentralized services not already on the secondary mobile computing device 106 by retrieving (or bootstrapping) those services from one or more mobile computing devices 102, 106 (or a stationary computing device). The method 400 returns to block 420 in which the mobile computing devices 102, 106 share node resources. In other words, the newly connected secondary mobile computing device 106 may participate in the decentralized cloud by offering and/or receiving offers for node resources.

Figure 6:
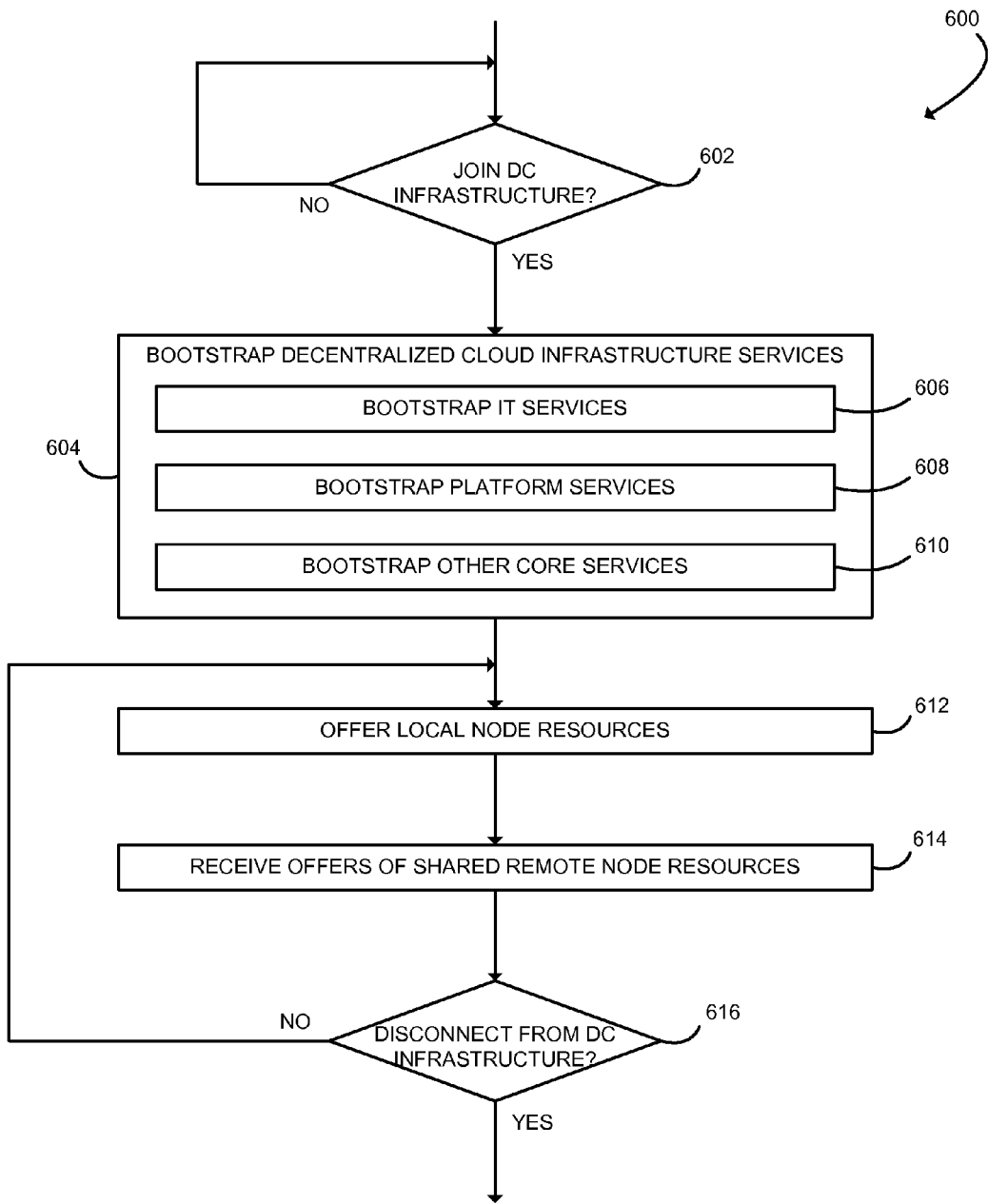
FIG. 6 is a simplified flow diagram of at least one embodiment of a method for joining a decentralized cloud infrastructure with a computing device of the system of FIG. 1.

Referring now to FIG. 6, in use, one of the secondary mobile computing devices 106 may execute a method 600 for joining a decentralized cloud infrastructure. The method 600 begins with block 602 in which the secondary mobile computing device 106 determines whether to join the decentralized cloud infrastructure. If so, the secondary mobile computing device 106 may bootstrap decentralized cloud infrastructure services in block 604. In doing so, the secondary mobile computing device 106 may bootstrap IT services in block 606, bootstrap platform services in block 608, and bootstrap other core services in block 610. As discussed above, the secondary mobile computing device 106 may participate in one or more layers of the decentralized cloud infrastructure. In block 612, the secondary mobile computing device 106 offers local node resources to the other mobile computing devices 102, 106. Additionally, in block 614, the secondary mobile computing device 106 may receive offers of shared local resources of the other mobile computing devices 102, 106. In block 616, the secondary mobile computing device 106 determines whether to disconnect from the decentralized cloud. If not, the method 600 returns to block 612 in which the mobile computing devices 101, 106 continue to share resources.

EXAMPLES

Illustrative examples of the devices, systems, and methods disclosed herein are provided below. An embodiment of the devices, systems, and methods may include any one or more, and any combination of, the examples described below.

Example 1 includes a mobile computing device for utilizing a decentralized cloud infrastructure. The mobile computing device includes a communication module to (i) broadcast for the formation of the decentralized cloud infrastructure, and (ii) establish a wireless communication connection with at least one secondary mobile computing device; and a decentralized service module to (i) establish the decentralized cloud infrastructure by sharing decentralized cloud services with the at least one secondary mobile computing device and (ii) establish shared cloud resources usable by the mobile computing device and the at least one secondary mobile computing device by offering local resources of the mobile computing device to the at least one secondary mobile computing device; and receiving offers of shared local resources of the at least one secondary mobile computing device.

Example 2 includes the subject matter of Example 1, and wherein the decentralized service module is further to retrieve at least one decentralized service not on the mobile computing device from a stationary computing device.

Example 3 includes the subject matter of any of Examples 1 and 2, and wherein the decentralized service module is to establish shared cloud resources in response to establishing the decentralized cloud infrastructure.

Example 4 includes the subject matter of any of Examples 1-3, and wherein the shared cloud resources comprise at least one of computational resources, storage resources, and cloud service resources.

Example 5 includes the subject matter of any of Examples 1-4, and wherein the decentralized services comprise decentralized platform services and decentralized information technology services.

Example 6 includes the subject matter of any of Examples 1-5, and wherein the decentralized service module is to share the decentralized services by transmitting decentralized services to the at least one secondary mobile computing device; and retrieving from the at least one secondary mobile computing device any required decentralized service not on the mobile computing device.

Example 7 includes the subject matter of any of Examples 1-6, and wherein the decentralized service module comprises a decentralized service module to establish a decentralized cloud network by establishing one or more service layers over the decentralized cloud infrastructure in a peer-to-peer mesh structure.

Example 8 includes the subject matter of any of Examples 1-7, and wherein the one or more service layers comprises at least one of: a decentralized platform service layer, a decentralized information technology service layer, and a decentralized user services layer.

Example 9 includes a mobile computing device for joining a decentralized cloud infrastructure including a plurality of nodes, the mobile computing device comprising a communication module to (i) establish a wireless communication connection with at least one node of the decentralized cloud infrastructure and (ii) receive one or more decentralized cloud services from the at least one node; a bootstrap module to bootstrap the one or more decentralized services on the mobile computing device; and a decentralized service module to establish shared cloud resources by (i) offering local resources of the mobile computing device to the at least one node and (ii) receiving offers of shared local resources of the at least one node.

Example 10 includes the subject matter of Example 9, and wherein the one or more decentralized cloud services received from the at least one node comprises decentralized services not on the mobile computing device.

Example 11 includes the subject matter of any of Examples 9 and 10, and wherein the decentralized service module is to establish shared cloud resources in response to bootstrapping the one or more decentralized services.

Example 12 includes the subject matter of any of Examples 9-11, and wherein the shared cloud resources comprise at least one of computational resources, storage resources, and cloud service resources.

Example 13 includes the subject matter of any of Examples 9-12, and wherein the decentralized services comprise decentralized platform services and decentralized information technology services.

Example 14 includes a method for utilizing a decentralized cloud infrastructure on a mobile computing device. The method includes broadcasting, from the mobile computing device, for the formation of the decentralized cloud infrastructure; establishing, with the mobile computing device, a wireless communication connection with at least one secondary mobile computing device; establishing, using the mobile computing device, the decentralized cloud infrastructure by sharing decentralized cloud services with the at least one secondary mobile computing device; and establishing, using the mobile computing device, shared cloud resources usable by the mobile computing device and the at least one secondary mobile computing device by (i) offering local resources of the mobile computing device to the at least one secondary mobile computing device and (ii) receiving offers of shared local resources of the at least one secondary mobile computing device.

Example 15 includes the subject matter of Example 14, and further including retrieving, with the mobile computing device, at least one decentralized cloud service not on the mobile computing device from a stationary computing device.

Example 16 includes the subject matter of any of Examples 14 and 15, and wherein establishing the shared cloud resources comprises establishing cloud resources in response to establishing the decentralized cloud infrastructure.

Example 17 includes the subject matter of any of Examples 14-16, and sharing the decentralize services comprises transmitting, from the mobile computing device, decentralized services to the at least one secondary mobile computing device; and retrieving, with the mobile computing device, any required decentralized service not on the mobile computing device from the at least one secondary mobile computing device.

Example 18 includes the subject matter of any of Examples 14-17, and wherein establishing the decentralized cloud infrastructure comprises establishing a decentralized cloud network by establishing one or more service layers over the decentralized cloud infrastructure in a peer-to-peer mesh structure.

Example 19 includes the subject matter of any of Examples 14-18, and wherein establishing the one or more service layers comprises establishing, over the decentralized cloud infrastructure, at least one of: a decentralized platform service layer, a decentralized information technology service layer, and a decentralized user services layer.

Example 20 includes a computing device comprising a processor; and a memory having stored therein a plurality of instructions that when executed by the processor cause the computing device to perform the method of any of Examples 14-19.

Example 21 includes one or more machine readable storage media comprising a plurality of instructions stored thereon that in response to being executed result in a computing device performing the method of any of Examples 14-19.

Example 22 includes a method for joining a decentralized cloud infrastructure comprising a plurality of nodes using a mobile computing device. The method includes establishing, using the mobile computing device, a wireless communication connection with at least one node of the decentralized cloud infrastructure; receiving, with the mobile computing device, one or more decentralized services from the at least one node; bootstrapping the one or more decentralized cloud services on the mobile computing device; and establishing, using the mobile computing device, shared cloud resources by (i) offering local resources of the mobile computing device to the at least one node and (ii) receiving offers of shared local resources of the at least one node.

Example 23 includes the subject matter of Example 22, and wherein receiving the one or more decentralized services comprises retrieving one or more decentralized cloud services not on the mobile computing device from the at least one node.

Example 24 includes the subject matter of any of Examples 22 and 23, and wherein establishing the shared cloud resources is in response to bootstrapping the one or more decentralized cloud services.

Example 25 includes a computing device comprising a processor; and a memory having stored therein a plurality of instructions that when executed by the processor cause the computing device to perform the method of any of Examples 22-24.

Example 26 includes one or more machine readable storage media comprising a plurality of instructions stored thereon that in response to being executed result in a computing device performing the method of any of Examples 22-24.

Example 27 includes a computing device for utilizing a decentralized cloud infrastructure. The computing device includes means for performing the method of any of Examples 22-24.

Example 28 includes a system for utilizing a decentralized cloud infrastructure. The system includes a plurality of mobile computing devices in which one mobile computing device of the plurality of mobile computing devices is to (i) broadcast for the formation of the decentralized cloud infrastructure and (ii) establish a wireless communication connection with at least one other mobile computing device; and the one mobile computing device and the at least one other mobile computing device of the plurality of mobile computing devices are to (i) establish the decentralized cloud infrastructure by sharing decentralized cloud services with each other and (ii) establish shared cloud resources by sharing local resources with each other.

Example 29 includes the subject matter of Example 28, and further including a stationary computing device to share decentralized cloud services with the one mobile computing device.

Example 30 includes the subject matter of any of Examples 28 and 29, and wherein the one mobile computing device is to retrieve at least one decentralized cloud service not on the one mobile computing device from the stationary computing device.

Example 31 includes the subject matter of any of Examples 28-30, and wherein the stationary computing device is further to share decentralized cloud services with the at least one other mobile computing device.

Example 32 includes the subject matter of any of Examples 28-31, and wherein the decentralized services comprise decentralized platform services and decentralized information technology services.

Example 33 includes the subject matter of any of Examples 28-32, and wherein to establish the decentralized cloud infrastructure comprises to establish the decentralized cloud infrastructure in response to the number of the mobile computing devices of the decentralized cloud infrastructure reaching a threshold number of devices.

Example 34 includes the subject matter of any of Examples 28-33, and wherein to establish the decentralized cloud infrastructure comprises to establish the decentralized cloud infrastructure within a predetermined amount of time.

Example 35 includes the subject matter of any of Examples 28-34, and wherein the one mobile computing device is to transmit a first decentralized service to the at least one other mobile computing device to share the decentralized cloud services.

Example 36 includes the subject matter of any of Examples 28-35, and wherein a first mobile computing device of the at least one other mobile computing device is to transmit a second decentralized service to a second mobile computing device of the at least one other mobile computing device to share the decentralized cloud services.

Example 37 includes the subject matter of any of Examples 28-36, and wherein the one mobile computing device and the at least one other mobile computing device are to establish the cloud resources in response to establishing the decentralized cloud infrastructure.

Example 38 includes the subject matter of any of Examples 28-37, and the one mobile computing device and the at least one other mobile computing device of the plurality of mobile computing devices are to establish a decentralized cloud network by establishing one or more service layers over the decentralized cloud infrastructure in a peer-to-peer mesh structure.

Example 39 includes the subject matter of any of Examples 28-38, and wherein the one or more service layers comprises at least one of: a decentralized platform service layer, a decentralized information technology service layer, and a decentralized user services layer.

The invention claimed is:

1. A mobile computing device for utilizing a decentralized cloud infrastructure, the mobile computing device comprising:
   a communication module to (i) broadcast for the formation of the decentralized cloud infrastructure, and (ii) establish a wireless communication connection with at least one secondary mobile computing device; and
   a decentralized service module to (i) establish the decentralized cloud infrastructure by sharing decentralized cloud services with the at least one secondary mobile computing device and (ii) establish shared cloud resources usable by the mobile computing device and the at least one secondary mobile computing device, wherein to establish the shared cloud resources comprises to:
   offer local resources of the mobile computing device to the at least one secondary mobile computing device;
   receive offers of shared local resources of the at least one secondary mobile computing device; and
   aggregate the local resources of the mobile computing device and the shared local resources of the at least one secondary mobile computing device to generate a virtual aggregated node resource.

2. The mobile computing device of claim 1, wherein the decentralized service module is further to retrieve at least one decentralized service not on the mobile computing device from a stationary computing device.

3. The mobile computing device of claim 1, wherein the decentralized service module is to establish shared cloud resources in response to establishing the decentralized cloud infrastructure, the shared cloud resources comprising at least one of computational resources, storage resources, and cloud service resources.

4. The mobile computing device of claim 1, wherein the decentralized service module is to transmit decentralized services to the at least one secondary mobile computing device and to retrieve from the at least one secondary mobile computing device any required decentralized service not on the mobile computing device to share the decentralized services.

5. The mobile computing device of claim 1, wherein the decentralized service module comprises a decentralized service module to establish one or more service layers over the decentralized cloud infrastructure in a peer-to-peer mesh structure to establish a decentralized cloud network.

6. The mobile computing device of claim 5, wherein the one or more service layers comprises at least one of: a decentralized platform service layer, a decentralized information technology service layer, and a decentralized user services layer.

7. The mobile computing device of claim 1, wherein the decentralized service module is to permit the mobile computing device to share the established shared cloud resources in response to a determination that a number of computing devices included in the decentralized cloud infrastructure exceeds a predefined critical number within a predefined period of time.

8. A mobile computing device for joining a decentralized cloud infrastructure having a plurality of nodes, the mobile computing device comprising:
   a communication module to (i) establish a wireless communication connection with at least one node of the decentralized cloud infrastructure and (ii) receive one or more decentralized cloud services from the at least one node;
   a bootstrap module to bootstrap the one or more decentralized services on the mobile computing device; and
   a decentralized service module to establish shared cloud resources as a function of (i) offers of local resources of the mobile computing device to the at least one node and (ii) receipts of offers of shared local resources of the at least one node, wherein to establish the shared cloud resources comprises to aggregate the local resources of the mobile computing device and the shared local resources of the at least one secondary mobile computing device to generate a virtual aggregated node resource.

9. The mobile computing device of claim 8, wherein the one or more decentralized cloud services received from the at least one node comprises decentralized services not on the mobile computing device.

10. The mobile computing device of claim 9, wherein the decentralized service module is to establish shared cloud resources in response to bootstrapping the one or more decentralized services.

11. A method for utilizing a decentralized cloud infrastructure on a mobile computing device, the method comprising:
    broadcasting, from the mobile computing device, for the formation of the decentralized cloud infrastructure;
    establishing, with the mobile computing device, a wireless communication connection with at least one secondary mobile computing device;
    establishing, using the mobile computing device, the decentralized cloud infrastructure by sharing decentralized cloud services with the at least one secondary mobile computing device; and
    establishing, using the mobile computing device, shared cloud resources usable by the mobile computing device and the at least one secondary mobile computing device by (i) offering local resources of the mobile computing device to the at least one secondary mobile computing device, (ii) receiving offers of shared local resources of the at least one secondary mobile computing device, and (iii) aggregating the local resources of the mobile computing device and the shared local resources of the at least one secondary mobile computing device to generate a virtual aggregated node resource.

12. The method of claim 11, further comprising retrieving, with the mobile computing device, at least one decentralized cloud service not on the mobile computing device from a stationary computing device.

13. The method of claim 11, wherein establishing the shared cloud resources comprises establishing cloud resources in response to establishing the decentralized cloud infrastructure.

14. The method of claim 11, wherein sharing the decentralize services comprises:
    transmitting, from the mobile computing device, decentralized services to the at least one secondary mobile computing device; and retrieving, with the mobile computing device, any required decentralized service not on the mobile computing device from the at least one secondary mobile computing device.

15. One or more non-transitory machine readable storage media comprising a plurality of instructions stored thereon that, in response to being executed, result in a mobile computing device:
broadcasting for the formation of the decentralized cloud infrastructure;
establishing a wireless communication connection with at least one secondary mobile computing device;
establishing the decentralized cloud infrastructure by sharing decentralized cloud services with the at least one secondary mobile computing device; and
establishing shared cloud resources usable by the mobile computing device and the at least one secondary mobile computing device by (i) offering local resources of the mobile computing device to the at least one secondary mobile computing device, (ii) receiving offers of shared local resources of the at least one secondary mobile computing device, and (iii) aggregating the local resources of the mobile computing device and the shared local resources of the at least one secondary mobile computing device to generate a virtual aggregated node resource.

16. The one or more non-transitory machine readable storage media of claim 15, wherein the plurality of instructions further result in the mobile computing device retrieving at least one decentralized cloud service not on the mobile computing device from a stationary computing device.

17. The one or more non-transitory machine readable storage media of claim 15, wherein establishing the shared cloud resources comprises establishing cloud resources in response to establishing the decentralized cloud infrastructure.

18. The one or more non-transitory machine readable storage media of claim 15, wherein sharing the decentralize services comprises:
transmitting, from the mobile computing device, decentralized services to the at least one secondary mobile computing device; and
retrieving, with the mobile computing device, any required decentralized service not on the mobile computing device from the at least one secondary mobile computing device.

19. The one or more non-transitory machine readable storage media of claim 15, wherein establishing the decentralized cloud infrastructure comprises establishing a decentralized cloud network by establishing one or more service layers over the decentralized cloud infrastructure in a peer-to-peer mesh structure.

20. The one or more non-transitory machine readable storage media of claim 19, wherein establishing the one or more service layers comprises establishing, over the decentralized cloud infrastructure, at least one of: a decentralized platform service layer, a decentralized information technology service layer, and a decentralized user services layer.

* * * * *